US007788545B2

(12) United States Patent
Yanagi

(10) Patent No.: US 7,788,545 B2
(45) Date of Patent: Aug. 31, 2010

(54) BROADCAST RECEIVING DEVICE

(75) Inventor: Tsutomu Yanagi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 399 days.

(21) Appl. No.: 12/043,333

(22) Filed: Mar. 6, 2008

(65) Prior Publication Data

US 2009/0070621 A1 Mar. 12, 2009

(30) Foreign Application Priority Data

Mar. 7, 2007 (JP) ............................ 2007-057113

(51) Int. Cl.
*G06F 11/00* (2006.01)

(52) U.S. Cl. ............................ 714/47; 714/4; 700/202; 702/130; 702/131; 702/132; 702/133; 702/134; 702/135; 702/136; 725/107; 725/110; 725/117; 725/131; 725/132; 725/134; 725/139; 725/140; 725/151; 725/152; 334/5; 348/554; 348/555; 348/558; 348/14.11; 348/14.12; 348/706

(58) Field of Classification Search ..................... 348/5, 348/5.5, 7, 554, 555, 14.11, 14.12, 706; 725/107, 725/110, 117, 131–132, 134, 139–140, 151–152; 334/5; 702/130–136; 700/202
See application file for complete search history.

(56) References Cited

U.S. PATENT DOCUMENTS 5,675,390 A * 10/1997 Schindler et al. ............ 715/717
6,325,636 B1 * 12/2001 Hipp et al. .................... 439/61
6,411,712 B1 * 6/2002 Yoshida et al. ................ 380/37
2004/0139260 A1 * 7/2004 Steinmetz et al. ........... 710/269
2005/0271079 A1 * 12/2005 Teoh .......................... 370/463
2007/0143801 A1 * 6/2007 Madonna et al. .............. 725/80

FOREIGN PATENT DOCUMENTS

JP 11-355751 A 12/1999
JP 2003-333625 A 11/2003
JP 2006-80600 A 3/2006

* cited by examiner

*Primary Examiner*—Robert Beausoliel
*Assistant Examiner*—Jeison C Arcos
(74) *Attorney, Agent, or Firm*—Global IP Counselors, LLP

(57) ABSTRACT

A broadcast receiving device includes a card slot, a fan, a temperature sensor, a memory component and a control unit. The card slot accepts an IC card. The fan rotates to cool the IC card. The temperature sensor measures a first temperature. The memory component stores correlation information indicating a correlation between the first temperature and a second temperature of the IC card. The control unit acquires the second temperature based on the first temperature and the correlation information. The control unit determines if the second temperature exceeds a predetermined temperature. The control unit switches from a first output mode, in which an audio-video signal is outputted via the IC card, to a second output mode, in which the audio-video signal is outputted by bypassing the IC card, when the control unit determines that the second temperature exceeds the predetermined temperature.

16 Claims, 9 Drawing Sheets

BROADCAST RECEIVING DEVICE

CROSS-REFERENCE TO RELATED APPLICATIONS

This application claims priority to Japanese Patent Application No. 2007-057113 filed on Mar. 7, 2007. The entire disclosure of Japanese Patent Application No. 2007-057113 is hereby incorporated herein by reference.

BACKGROUND OF THE INVENTION

1. Field of the Invention

The present invention generally relates to a television receiving device. More specifically, the present invention relates to a television receiving device that receives television broadcasts.

2. Background Information

Broadcast signals of pay channels are transmitted in digital cable television broadcasts in North America. The broadcast signals of the pay channels are scrambled (encoded). To enjoy video and audio of the pay channel, the scrambled broadcast signal must first be descrambled (decoded). A descrambler (signal processing circuit) is used to descramble the scrambled broadcast signal. The descrambler is generally built into an IC card that conforms to the standards of PCMCIA (Personal Computer Memory Card International Association) or the like. Therefore, television sets, video devices such as optical disk recorders and hard disk recorders, and STBs (Set Top Boxes) and other such television receivers intended for the North American market include a card slot for inserting the IC card (see Japanese Laid-Open Patent Application Publication No. H11-355751, for example). With the television receivers, when voltage is supplied to the IC card inserted in the card slot, and the descrambler and other circuits are operated, the IC card generates heat. North American digital cable standards specify that the temperature of the IC card be kept at 65° C. or lower at all times, regardless of whether the main power supply of the television receiver is on or off, in order to prevent malfunction of the IC card.

Meanwhile, conventional television receivers include a temperature sensor for measuring internal temperature and a fan for cooling interior. (see Japanese Laid-Open Patent Application Publication No. 2006-80600 or Japanese Laid-Open Patent Application Publication No. 2003-333625, for example). With the conventional television receivers (see Japanese Laid-Open Patent Application Publication No. 2006-80600, for example), a fan speed is controlled based on the temperature measured by the temperature sensor. If it is detected that the fan is not rotating or that the temperature measured by the temperature sensor has exceeded an upper limit, then a CATV center is notified of a problem, and an alarm is outputted. When a response from the CATV center is received, power supply to various components of the television receiver is shut off. With the conventional television receiver (see Japanese Laid-Open Patent Application Publication No. 2003-333625, for example), signal levels of the broadcast channels are monitored with a level meter. Voltage supply to the fan is switched based on the temperature measured by the temperature sensor. Specifically if the temperature of the level meter deviates from a permissible operating temperature range of the level meter, then the power supply to the level meter is halted. Furthermore, a system manager is notified by cordless telephone. With another conventional television receiver (see Japanese Laid-Open Patent Application Publication No. H11-355751, for example), a card detector circuit detects whether or not the IC card has been inserted. Then, a test signal is multiplexed with the received broadcast signal and inputted to the IC card. If the test signal cannot be detected from the output signal from the IC card, then it is determined that the IC card has malfunctioned. Then, the determination result is displayed on the television screen. Furthermore, the IC card is electrically separated from a main unit to prevent the effect of the malfunction from extending to the entire television receiver.

When a fan is built into a television receiver to cool the IC card as discussed above, if the fan should malfunction and cease operating normally, then there is a risk that heat will cause the IC card to malfunction. Also, with the conventional television receiver, the temperature of the IC card cannot be accurately sensed. Thus, it is difficult to properly deal with the IC card when the temperature becomes too high. Therefore, there is a risk that malfunction of the IC card due to heat cannot be prevented.

In view of the above, it will be apparent to those skilled in the art from this disclosure that there exists a need for an improved television receiving device. This invention addresses this need in the art as well as other needs, which will become apparent to those skilled in the art from this disclosure.

SUMMARY OF THE INVENTION

The present invention was conceived in light of the abovementioned problems. One object of the present invention is to provide a television receiving device with which the malfunction of an IC card due to heat can be prevented.

In accordance with one aspect of the invention, a broadcast receiving device includes a card slot, a fan, a temperature sensor, a memory component and a control unit. The card slot is configured to accept an IC card. The fan is configured to rotate to cool the IC card. The temperature sensor is configured to measure a first temperature. The memory component is configured to store correlation information indicating a correlation between the first temperature measured by the temperature sensor and a second temperature of the IC card. The control unit is configured to acquire the second temperature of the IC card based on the first temperature measured by the temperature sensor and the correlation information stored in the memory component. The control unit is configured to determine if the second temperature of the IC card exceeds a predetermined temperature. The control unit is configured to switch from a first output mode, in which an audio-video signal is outputted via the IC card, to a second output mode, in which the audio-video signal is outputted by bypassing the IC card, when the control unit determines that the second temperature of the IC card exceeds the predetermined temperature.

With the television receiving device of the present invention, it is possible to provide a television receiving device with which the malfunction of an IC card due to heat can be prevented.

These and other objects, features, aspects and advantages of the present invention will become apparent to those skilled in the art from the following detailed description, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
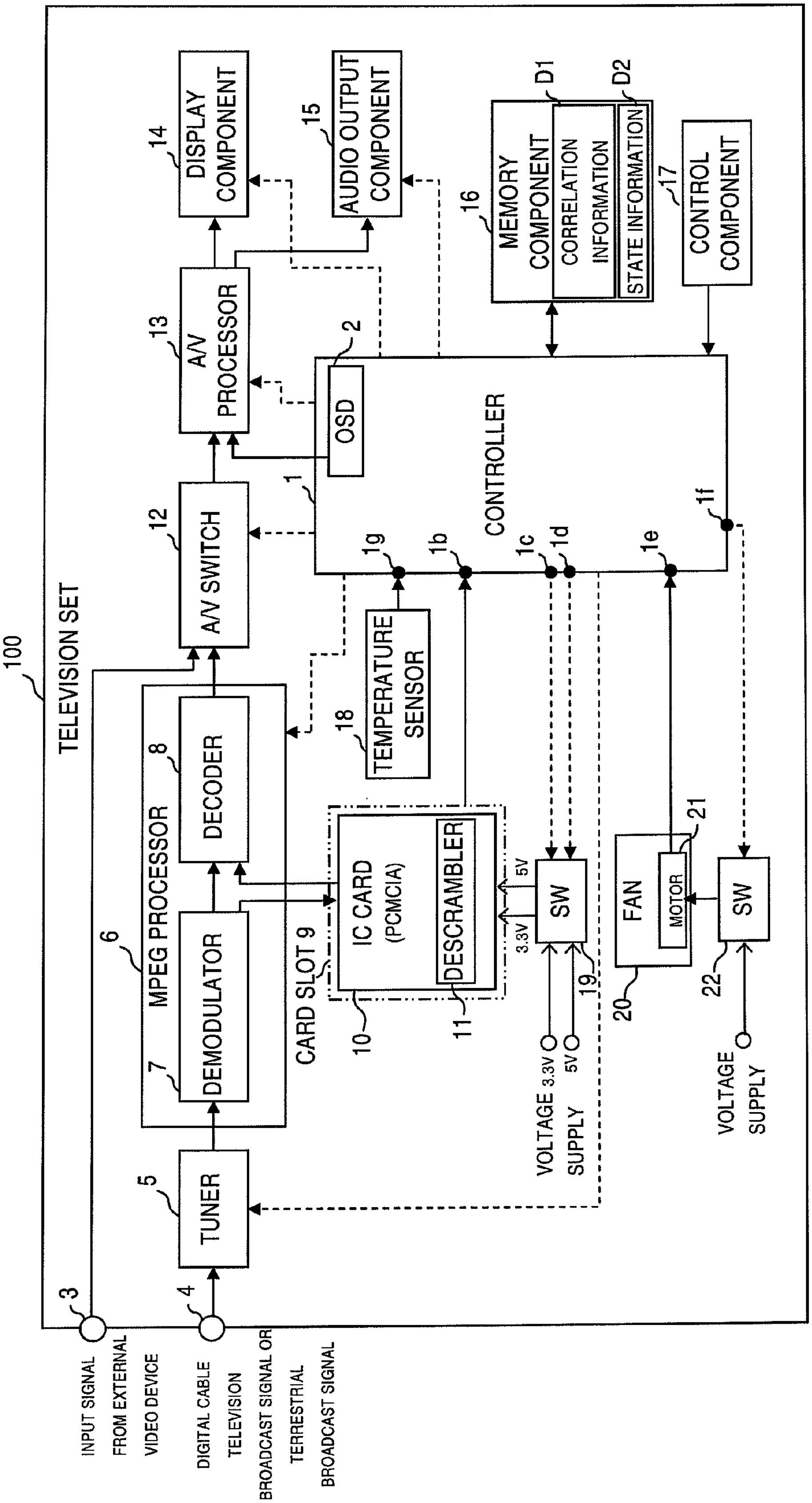
FIG. 1 is a block diagram illustrating a television set in accordance with a first embodiment of the present invention.

FIG. 1 is a block diagram illustrating a television set 100. The television set 100 includes a controller (e.g., control unit) 1, a tuner 5, an MPEG (Moving Picture Experts Group) processor 6, a card slot 9, an IC card 10, an A/V switch 12, A/V processor 13, a display component (e.g., image display unit) 14, an audio output component (e.g., audio output unit) 15, a memory component 16, a control component 17, a temperature sensor 18, a switch 19, a fan 20 and a switch 22. The controller 1 includes a CPU, a memory such as a ROM or RAM, an OSD (On Screen Display) circuit 2, and so forth. The controller 1 controls the various components of the television set 100. The controller 1 has a plurality of ports 1*b* to 1*f*. The television set 100 is connected by cables or the like to an optical disk player, optical disk recorder, hard disk recorder, or other such external video devices for handling DVDs (Digital Versatile Disks), Blu-ray Discs, or other optical disks. Signals (video and audio signals, etc.) outputted from the external video devices are inputted from an input terminal 3 to the television set 100. The signal inputted from the input terminal 3 is hereinafter referred to as an external input signal. A cable or the like for transmitting digital cable broadcast signals or terrestrial broadcast signals is connected to the television set 100. These broadcast signals (carrier waves) are inputted from an input terminal 4 to the television set 100. The broadcast signals of pay channels in cable television broadcasts are scrambled. The terrestrial broadcast signals and the broadcast signals of free channels in cable television broadcasts are not scrambled.

The tuner 5 extracts a signal of the frequency of the tuned-in channel from the broadcast signals received through the input terminal 4. The tuner 5 inputs the signal to the MPEG processor 6. The MPEG processor 6 includes various signal processing circuits for performing MPEG processing, such as a demodulator 7 and a decoder 8. The card slot 9 accepts the IC card 10. The IC card 10 meets PCMCIA standards. The IC card 10 includes a descrambler (signal processing circuit) 11. The descrambler descrambles scrambled digital cable television broadcast signals. The GPIO (General Purpose Input/Output port) 1*b* (e.g., insertion detection unit) of the controller 1 is assigned to card detection. The GPIO 1*b* is connected to a built-in circuitry of the IC card 10. The voltage applied to the GPIO 1*b* is at a high level when the IC card 10 is inserted in the card slot 9, and is at a low level when the IC card 10 is not inserted in the card slot 9. The controller 1 detects whether or not the IC card 10 is inserted in the card slot 9 from the voltage level of the GPIO 1*b*.

The terrestrial broadcast signal inputted to the MPEG processor 6 is demodulated by the demodulator 7. Then, the terrestrial broadcast signal is decoded into an audio-video signal by the decoder 8, and inputted to the A/V switch 12. In other words, the audio-video signal based on the terrestrial broadcast signal is outputted by bypassing the IC card 10. The digital cable television broadcast signal inputted to the MPEG processor 6 is demodulated by the demodulator 7. Then, the digital cable television broadcast signal goes through the IC card 10. The digital cable television broadcast signal is decoded into an audio-video signal by the decoder 8, and inputted to the A/V switch 12. In other words, the audio-video signal based on the digital cable television broadcast signal is outputted via the IC card 10. Of the digital cable television broadcast signals inputted to the IC card 10, only scrambled signals are descrambled by the descrambler 11 of the IC card 10. The A/V switch 12 includes a signal switching circuit. The controller 1 uses the A/V switch 12 to switch the audio-video signal inputted to the A/V processor 13 between the input signal from the MPEG processor 6 and the external input signal from the input terminal 3. The A/V processor 13 acquires a video signal and an audio signal by subjecting the inputted digital audio-video signal to analog conversion or other such processing. Then, the A/V processor 13 outputs the video signal to the display component 14, and outputs the audio signal to the audio output component 15. The display component 14 includes a liquid crystal display or the like. The display component 14 displays video based on the inputted video signal. The audio output component 15 includes a speaker or the like. The audio output component 15 outputs audio based on the inputted audio signal. A video signal from the OSD circuit 2 is inputted to the A/V processor 13. The controller 1 uses the OSD circuit 2 and the A/V processor 13 to create on-screen displays of various kinds of information on the display component 14.

The memory component 16 includes a volatile or nonvolatile memory or the like. The control component 17 includes a control panel provided to a front side of a main body of the television set 100, a remote control, a remote control receiving circuit, and so forth. The control panel and the remote control include various keys, such as channel keys and a switch for turning main power supply on and off to the television set 100. The temperature sensor 18 is provided near the card slot 9. The temperature measured by the temperature sensor 18 is outputted to the A/D or ICC port 1*g* of the controller 1. Correlation information D1 indicating correlations between the temperature of the IC card 10 inserted in the card slot 9 (e.g., second temperature) and the temperature measured by the temperature sensor 18 (e.g., first temperature) is stored ahead of time in the memory component 16. The correlation information D1 is data indicating the corresponding relation of the temperature of the IC card 10 to the temperature measured by the temperature sensor 18. Specifically, upon manufacturing the television set 100, for example, the temperature of the IC card 10 inserted in the card slot 9 is measured by a separate temperature sensor and the temperature of the IC card 10 is also measured by the temperature sensor 18, while the voltage supply to the IC card 10 is switched on without the fan 20 rotating, a digital cable broadcast signal is inputted to the IC card 10 and the descrambler 11 is actuated. Then, the data indicating the correlation between the temperatures measured by the separate temperature sensor and the temperature sensor 18 is stored as the correlation information D1. The controller 1 senses the temperature of the IC card 10 based on the correlation information D1 from the memory component 16 and the temperature measured by the temperature sensor 18. Also, the controller 1 records in the memory component 16 information (state information D2) indicating states of the various components when the main power supply of the television set 100 is off, as will be discussed below.

The switch 19 includes a voltage switching circuit. To actuate the IC card 10, a voltage of 3.3 V or 5 V is supplied to the IC card 10 according to the specifications of the IC card 10. GPIOs 1*c* and 1*d* of the controller 1 are connected to the switch 19. The GPIO 1*c* is assigned to supplying 3.3 V. The GPIO 1*d* is assigned to supplying 5 V. The controller 1 outputs a control signal from the GPIO 1*c* or 1*d*, according to the specifications of the IC card 10, to the switch 19 to turn on or off the respective 3.3 V or 5 V voltage supply to the IC card 10.

The fan 20 is provided near the card slot 9. The fan 20 is rotated by the drive force of a built-in motor 21. The switch 22 includes a voltage switching circuit. A GPIO 1*f* of the controller 1 is connected to the switch 22. The GPIO *f* is assigned to the voltage supply to the controller 1. The controller 1 outputs a control signal from the GPIO *f* to the switch 22. The control signal turns on or off the voltage supply to the fan 20, or changes the level of the voltage supply. The controller 1 rotates the fan 20 to cool the IC card 10. The controller 1 also controls the rotational speed of the fan 20 based on the temperature of the IC card 10. A GPIO 1*e* of the controller 1 (e.g., speed sensing unit) assigned to rotational speed sensing is connected to the motor 21. The controller 1 senses a drive current level of the motor 21 from the GPIO 1*e*, and senses the speed of the fan 20 based on the drive current level. In addition, an encoder or the like may be used to sense the rotational speed.

Figure 2:
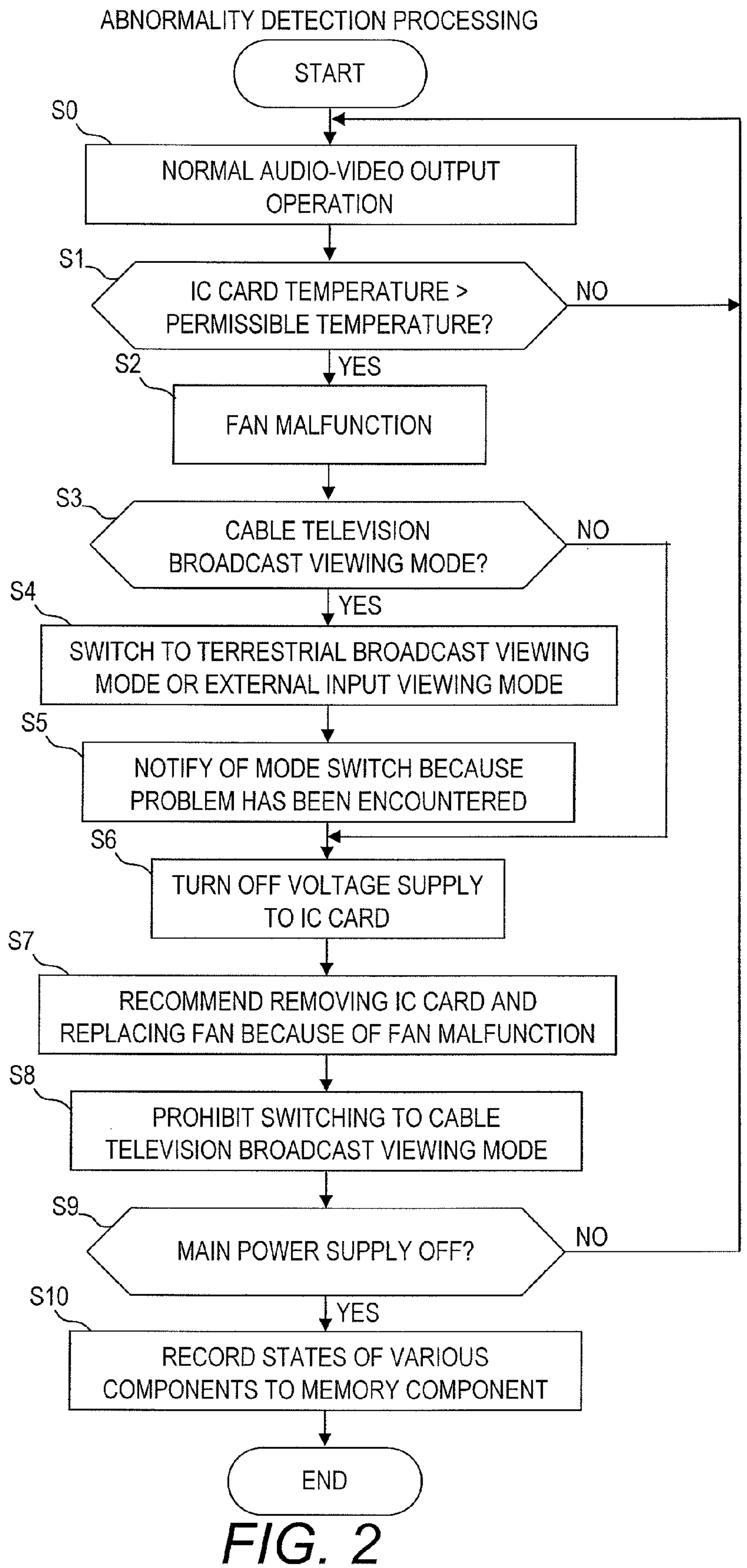
FIG. 2 is a flowchart illustrating an operation of the television set illustrated in FIG. 1.

FIG. 2 is a flowchart of an operation in abnormality detection processing performed by the television set 100. All of the processing is executed by the controller 1. After the television set 100 has been turned on, normal audio-video output operation is executed (step S0). In the normal audio-video output operation, either a digital cable television broadcast signal, a terrestrial broadcast signal, or an external input signal is received. Furthermore, video is displayed on the display component 14 and audio is outputted from the audio output component 15 based on the received signal. The controller 1 periodically monitors the temperature of the IC card 10 based on the live temperature measured by the temperature sensor 18 and the correlation information D1 from the memory component 16. During the normal audio-video output operation, the IC card 10 is inserted in the card slot 9, the voltage supply to the IC card 10 is turned on, and the fan 20 is rotated to cool the IC card 10.

If the temperature of the IC card 10 exceeds the preset permissible temperature (such as 65° C.) (Yes in step S1), then the controller 1 determines that the fan 20 has malfunctioned (step S2). Specifically, the controller 1 determines that the fan 20 is not operating properly. If the television set 100 is in a cable television broadcast viewing mode (e.g., first output mode) (Yes in step S3), then the controller 1 switches the television set 100 to a terrestrial broadcast viewing mode (e.g., second output mode) or an external input viewing mode (e.g., second output mode) (step S4). The cable television broadcast viewing mode is a mode in which video is displayed on the display component 14 and audio is outputted from the audio output component 15 based on a cable broadcast signal that can be descrambled by the descrambler 11 of the IC card 10. In other words, the cable television broadcast viewing mode is a mode in which the video and the audio are outputted via the IC card 10. The terrestrial broadcast viewing mode or the external input viewing mode is a mode in which video is displayed on the display component 14 and audio is outputted from the audio output component 15 based on a terrestrial broadcast signal or an external input signal that does not need to be descrambled by the descrambler 11 of the IC card 10. In other words, the terrestrial broadcast viewing mode or the external input viewing mode is a mode in which the video and the audio are outputted by bypassing the IC card 10. The phrase "cable broadcast signal that can be descrambled by the descrambler 11" above means broadcast signals of all cable television broadcasts that have been set to be inputted to the IC card 10, regardless of whether or not they have actually been scrambled. The mode after switching, to which a mode prior to switching is switched, is preset and stored in the memory component 16. It is also possible for the user to set the mode after switching via various setting screens.

Figure 3:
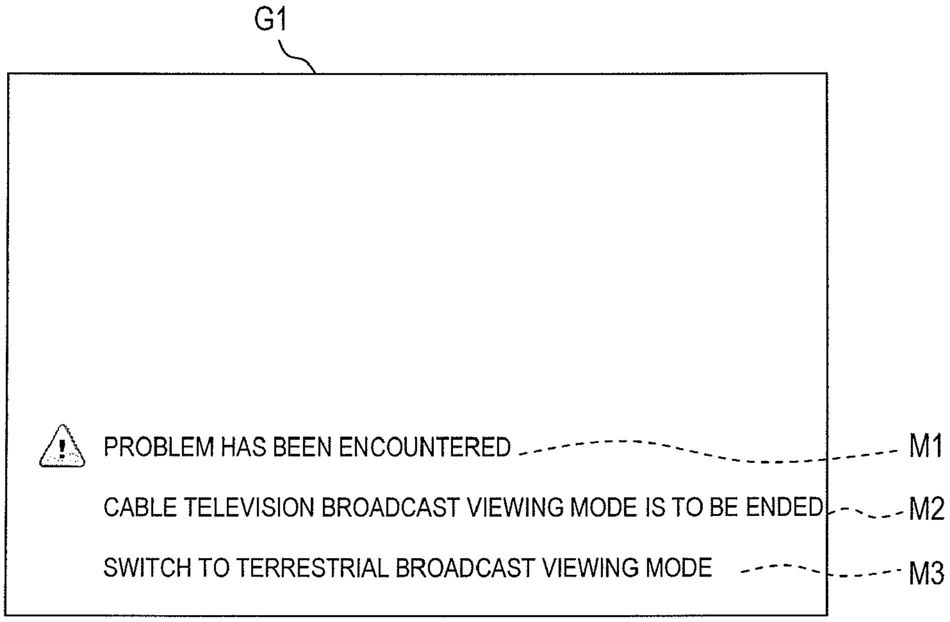
FIG. 3 is a screen shot displayed on a display component of the television set illustrated in FIG. 1.

Also, the controller 1 notifies the user that the viewing mode will be switched because a problem has been encountered, by displaying a message on the display component 14 (step S5). FIG. 3 is a screen shot displayed on the display component 14. On the screen G1 of the display component 14, messages M1 to M3 are displayed. The message M1 indicates that a problem has been encountered. The message M2 indicates that the cable television broadcast viewing mode is to be ended. The message M3 indicates a switch to the terrestrial broadcast viewing mode. Blue background, black background, or another fixed image, an image acquired in the mode after switching, or the like is displayed in the portion of the screen G1 other than the messages M1 to M3. The messages M1 to M3 are displayed for a specific length of time. On the other hand, if the television set 100 is not in cable television broadcast viewing mode in step S3 in FIG. 2 (No in step S3), then the controller 1 relays the current terrestrial broadcast viewing mode or external input viewing mode.

Figure 4:
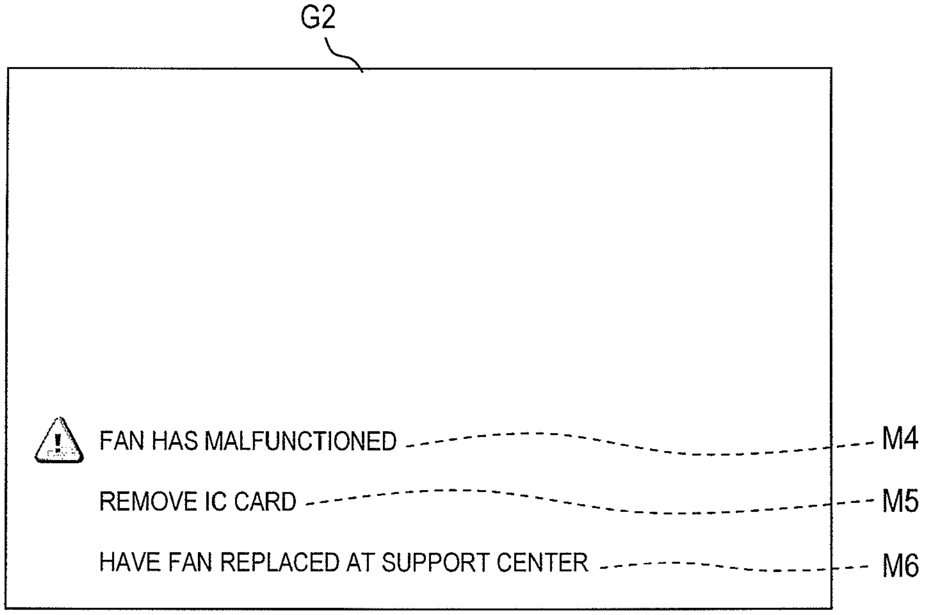
FIG. 4 is a screen shot displayed on the display component of the television set illustrated in FIG. 1.

The controller 1 turns off the voltage supply to the IC card 10 (step S6). Then, the controller 1 issues a notification by displaying a message recommending the removal of the IC card 10 from the card slot 9 and the replacement of the fan 20 because the fan 20 has malfunctioned on the display component 14 (step S7). FIG. 4 is a screen shot displayed on the display component 14. On the screen G2 of the display component 14, messages M4 to M6 are displayed. The message M4 indicates the malfunction of the fan 20. The message M5 recommends the removal of the IC card 10. The message M6 recommends the replacement of the fan 20 at a support center. An image acquired in the mode after switching or the like is displayed in the portion of the screen G2 other than the messages M4 to M6. The messages M4 to M6 are displayed for a specific length of time. The controller 1 then prohibits any subsequent switching to the cable television broadcast viewing mode (step S8 in FIG. 2). More specifically, a prohibition flag for the cable television broadcast viewing mode provided to a built-in memory or the like is switched on. Thus, even if the control component 17 is operated and a channel of the cable television broadcast is tuned in, the various components will not be allowed to carry out the operation for outputting the video and audio of the channel. Thus, the video and audio of the channel cannot be viewed or heard.

When the main power supply of the television set 100 is turned off (Yes in step S9), the controller 1 records the states of the various components in the memory component 16 (step S10; state information D2 in FIG. 1). Then, the processing is concluded. Examples of the content of the state information D2 produced in step S10 include that the IC card 10 has reached an abnormal temperature, that the fan 20 has malfunctioned, that the user has been notified of the malfunction of the fan 20 and to replace the fan 20 and remove the IC card 10, and that switching to the cable television broadcast viewing mode has been prohibited. When the main power supply is turned off, the voltage supply to the various components is also turned off (halted), and the television set 100 enters a stand-by state. Turning the main power supply off in step S9 may be accomplished forcibly by the controller 1 after step S8, or may be performed by the controller 1 when the user has switched off the main power supply or the timer has reached the main power supply switch-off time.

Figure 5:
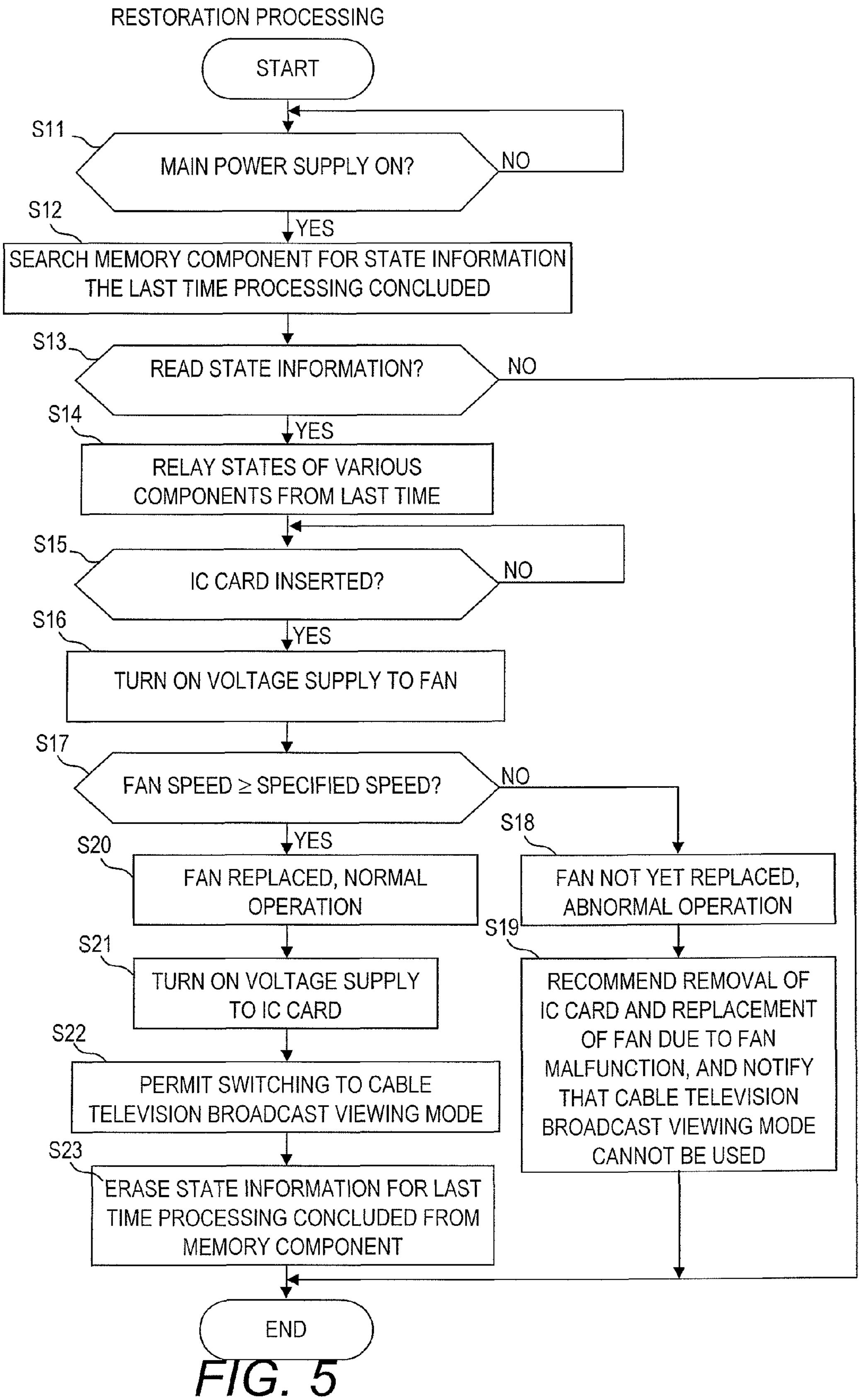
FIG. 5 is a flowchart illustrating an operation of the television set illustrated in FIG. 1.

FIG. 5 is a flowchart illustrating an operation in restoration processing performed by the television set 100. All of the processing is executed by the controller 1. First, when the main power supply of the television set 100 is turned on (Yes in step S11), the controller 1 searches the memory component 16 for the state information D2 of the various components produced the last time the abnormality detection processing was concluded (when the main power supply was turned off) (step S12). When the main power supply is turned on, the power supply is turned on (begun) to the various components, and the television set 100 enters an actuated state. Turning on the main power supply in step S11 is performed by the controller 1 when the user has switched on the main power supply, or when the timer has reached the main power supply switch-on time. The restoration processing is concluded if the controller 1 cannot find and read the state information D2 in the memory component 16 (No in step S13) because no state information D2 was recorded to the memory component 16 the last time the processing was concluded. On the other hand, when the state information D2 was recorded to the memory component 16 the last time the processing was concluded, the controller 1 can find and read the state information D2 in the memory component 16 (Yes in step S13). Then the states of the various components the last time as indicated by the state information D2 are relayed (step S14). In other words, the controller 1 applies the state indicated by the state information D2 to the various components of the television set 100. More specifically, the controller 1 recognizes from the state information D2 that the controller 1 detected the abnormal temperature of the IC card 10 and the malfunction of the fan 20 during the previous operation, switched off the voltage supply to the IC card 10, notified the user of the malfunction of the fan 20 and to replace the fan 20 and remove the IC card 10, prohibited a switch to the cable television broadcast viewing mode. Then, the controller 1 leaves the voltage supply to the IC card 10 off, and leaves switching to the cable television broadcast viewing mode prohibited.

Figure 6:
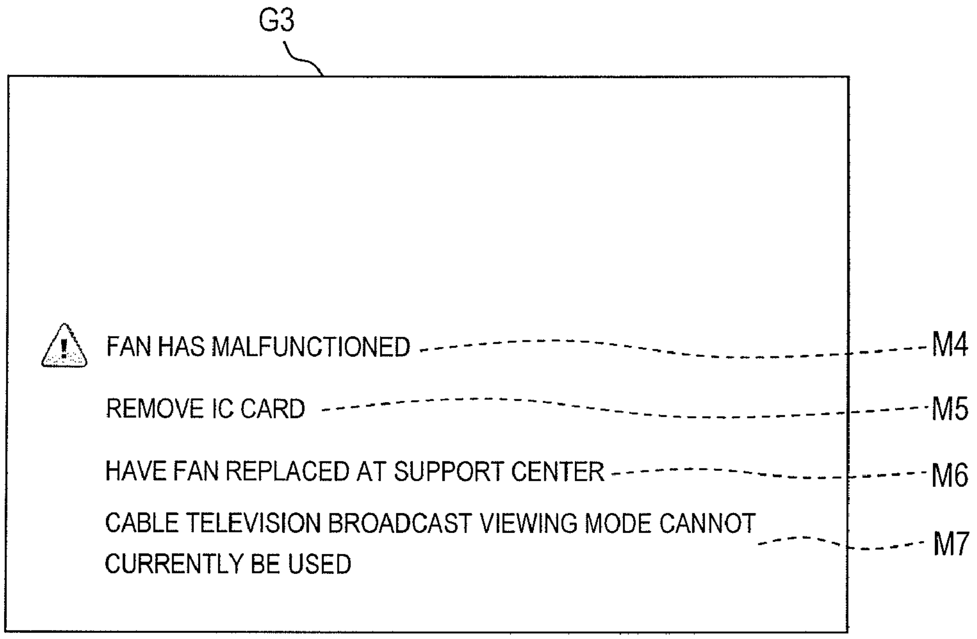
FIG. 6 is a screen shot displayed on the display component of the television set illustrated in FIG. 1.
Figure 7:
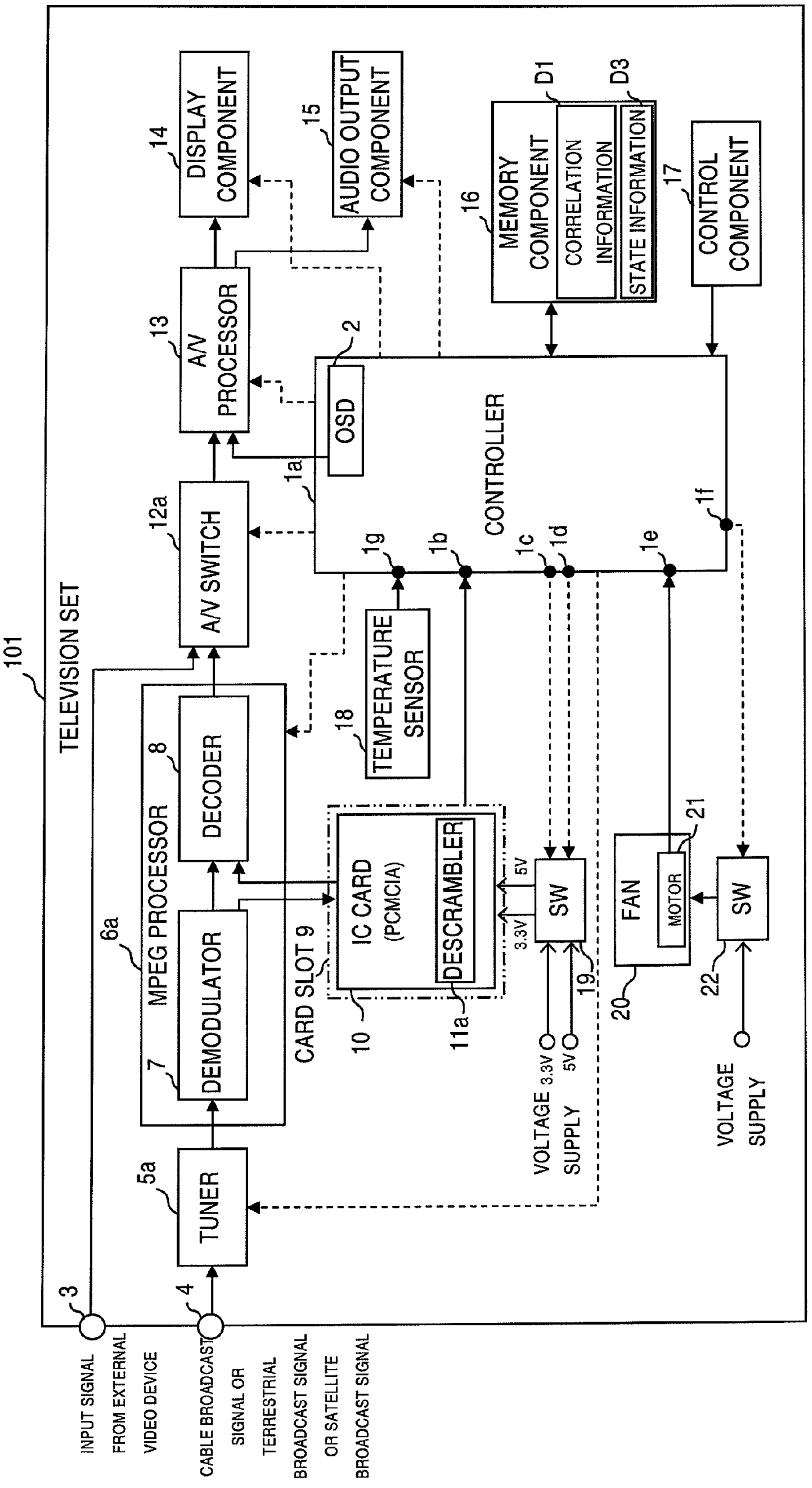
FIG. 7 is a block diagram illustrating a television set in accordance with a second embodiment of the present invention.

If the controller 1 detects that the IC card 10 is inserted in the card slot 9 (Yes in step S15), then the controller 1 turns on the voltage supply to the fan 20 (step S16). The controller 1 periodically monitors the rotational speed of the fan 20 (step S17). If the speed of the fan 20 does not go up to or above the specific speed corresponding to the level of the voltage supply after a time (No in step S17), then the controller 1 determines that the fan 20 has not been replaced and is still operating abnormally (step S18). The controller 1 then notifies the user by displaying a message on the display component 14. The message recommends the removal of the IC card 10 and the replacement of the fan 20 because the fan 20 has malfunctioned, and indicates that the cable television broadcast viewing mode cannot be used (step S19). Then, the processing is concluded. FIG. 6 is a screen shot displayed on the display component 14. On the screen G3 of the display component 14, the messages M4 to M6 and a message M7 are displayed. The message M4 indicates the malfunction of the fan 20. The message M5 recommends the removal of the IC card 10. The message M6 recommends the replacement of the fan 20. The message M7 indicates that the cable television broadcast viewing mode cannot currently be used. An image acquired in the mode after switching or the like (an image acquired in the terrestrial broadcast viewing mode or the external input viewing mode) is displayed in the portion of the screen G3 other than the messages M4 to M7. The messages M4 to M7 are displayed for a specific length of time.

Meanwhile, if the speed of the fan 20 does go up to or above the specific speed for some time after the voltage supply to the fan 20 has been turned on (No in step S17), then the controller 1 determines that the fan 20 has been replaced and is operating normally (step S20). The controller 1 then turns on the voltage supply to the IC card 10 (step S21). Then, the controller 1 permits switching to the cable television broadcast viewing mode (step S22). More specifically, the prohibition flag for the cable television broadcast viewing mode is switched off. Thus when the control component 17 is operated to tune in a channel of the cable television broadcast, the operation for outputting video and audio for the channel is carried out for the various components. Then, the video and audio is allowed to be viewed and heard. The controller 1 then erases from the memory component 16 the state information D2 for the last time processing was concluded (step S23). Then, the processing is concluded.

With the television set 100, the temperature of the IC card 10 inserted in the card slot 9 can be accurately sensed based on the temperature measured by the temperature sensor 18 and the correlation information D1. If the temperature of the IC card 10 should exceed the permissible temperature, then the operation of the IC card 10 is halted and the generation of heat is suppressed. Specifically, the television set 100 is switched from the cable television broadcast viewing mode to the terrestrial broadcast viewing mode, or the voltage supply to the IC card 10 is switched off, or switching to the cable television broadcast viewing mode is prohibited. Thus, even if the fan 20 should malfunction and no longer operate properly, it will still be possible to prevent the IC card 10 from malfunctioning due to heat.

Also, with the conventional television receivers, if the fan should malfunction or if the internal temperature should exceed a certain level, then the supply of voltage to the various components is halted. Thus, the television receiver cannot be used. However, with the television set 100, the operation of the IC card 10 is halted and only the use of the cable television broadcast viewing mode is prohibited. Thus, even if the fan 20 should malfunction, or even if the temperature of the IC card 10 should exceed the permissible temperature, the IC card 10 will be protected while the television set 100 can still be used in the terrestrial broadcast viewing mode or the external input viewing mode. Therefore, the user is allowed to view and hear the video and audio.

Also, the messages M4 to M6 advising of the malfunction of the fan 20 and recommending the removal of the IC card 10 and the replacement of the fan 20 are displayed on the display component 14. Thus, the user is made aware of the malfunction of the fan 20 right away, and can promptly remove the IC card 10 and replace the fan 20. If the malfunctioning fan 20 has not be replaced after the main power supply is turned on, then the messages M4 to M7 are displayed on the display component 14. Thus, even if the user should forget or the user is somebody else, the user will be notified again that the fan 20 is malfunctioning and the cable television broadcast viewing mode cannot be used. Therefore, it is possible to remove the IC card 10 and replace the fan 20 promptly. Accordingly, the IC card 10 is prevented even better from malfunctioning due to heat. Also, since the messages M1 to M3 indicating that the viewing mode is being forcibly switched because a problem has been encountered are displayed on the display component 14, the user is less startled by a sudden change in the viewing mode.

Also, the states of the various components when the temperature of the IC card 10 exceeds the permissible temperature are relayed the next time the main power supply is turned on. Thus, no matter how many times the set is turned on while the fan 20 is malfunctioning, the voltage supply to the IC card 10 will not be on, and switching to the cable television broadcast viewing mode can be prohibited. Therefore, the operation of the IC card 10 does not begin, and heat generation is suppressed. Accordingly, the IC card 10 can be prevented even better from malfunctioning due to heat.

Furthermore, if the television set 100 detects that the fan 20 has been replaced when the main power supply is turned on, then the IC card 10 is actuated immediately, and the state information D2 produced when the last time processing was concluded is erased. Thus, the television set 100 can be restored to being used in the cable television broadcast viewing mode. Therefore, the user can view, hear, and enjoy video and audio both from cable television broadcasts and from terrestrial broadcasts and external inputs.

The present invention can employ various other modes besides that of the embodiment given above. For instance, with the television set 100, the digital cable television broadcast signals, the terrestrial broadcast signals, and the external input signals are received. However, the television set 100 can also receive two or more signals out of digital and analog cable television broadcast signals, terrestrial broadcast signals, satellite broadcast signals, and external input signals, and use an inserted IC card to descramble any received signals that are scrambled. Furthermore, the television set 100 can be an STB or other such television receiver, or a video device such as an optical disk recorder or hard disk recorder.

Second Embodiment

Referring now to FIGS. 7 to 10, a television set 101 and a television receiver 102 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 8:
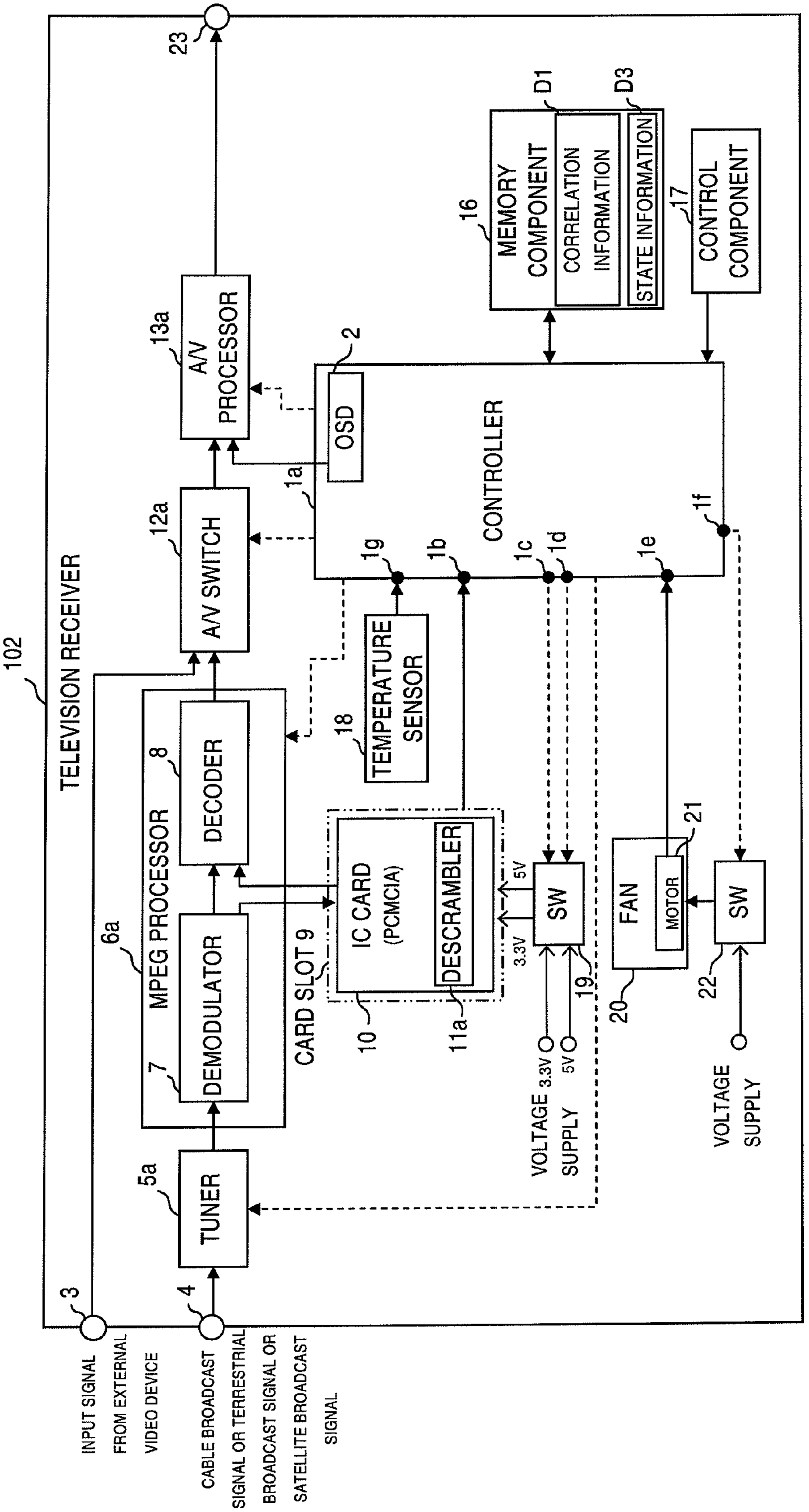
FIG. 8 is a block diagram illustrating a television receiver in accordance with a second embodiment of the present invention.

The television receiver 102 shown in FIG. 8 is applied to an STB, a video device such as an optical disk recorder or hard disk recorder, or the like. The television receiver 102 does not include a display component for displaying video or an audio output component for outputting audio. No optical disk, hard disk drive, or other such recording apparatus is shown in the drawings. With the television set 101 shown in FIG. 7 and the television receiver 102 shown in FIG. 8, a digital or analog cable television broadcast signal, a terrestrial broadcast signal or a satellite broadcast signal is inputted from the input terminal 4. Of these broadcast signals, broadcast signals of pay channels are scrambled, while broadcast signals of free channels are not scrambled. An external input signal is inputted from the input terminal 3. The External input signal is not scrambled. A tuner **5*a* includes an analog/digital-compatible tuner that receives the above-mentioned broadcast signals. The tuner 5*a* extracts a signal of the frequency of the tuned-in channel from the broadcast signals received through the input terminal 4. The tuner 5*a* then inputs just the digital broadcast signals to an MPEG processor 6*a*. On the other hand, the analog broadcast signals are converted into audio-video signals and inputted to an A/V switch 12*a***.

Of the digital broadcast signals, the MPEG processor **6*a* inputs the scrambled broadcast signals from the demodulator 7, through the IC card 10, and to the decoder 8. The MPEG processor 6*a* inputs the unscrambled broadcast signals from the demodulator 7 to the decoder 8. Of the cable television broadcast signals, the terrestrial broadcast signals, and the satellite broadcast signals, any scrambled signals are descrambled by a descrambler 11*a* of the IC card 10. A controller la uses the A/V switch 12*a* to switch the audio-video signal inputted to the A/V processor 13 (FIG. 7) or an A/V processor 13*a* (FIG. 8) to either the input signal from the MPEG processor 6, the input signal from the tuner 5*a*, and the external input signal from the input terminal 3. The A/V processor 13 of FIG. 7 outputs video signals to the display component 14 and audio signals to the audio output component 15 from out of the inputted digital or analog audio-video signals. The A/V processor 13*a* of FIG. 8 subjects the inputted digital or analog audio-video signals to analog conversion or digital conversion or other such processing. Then, the A/V processor 13*a* output the processed signal from an output terminal 23** to an external television set (not shown) or to a built-in recording apparatus.

Figure 9:
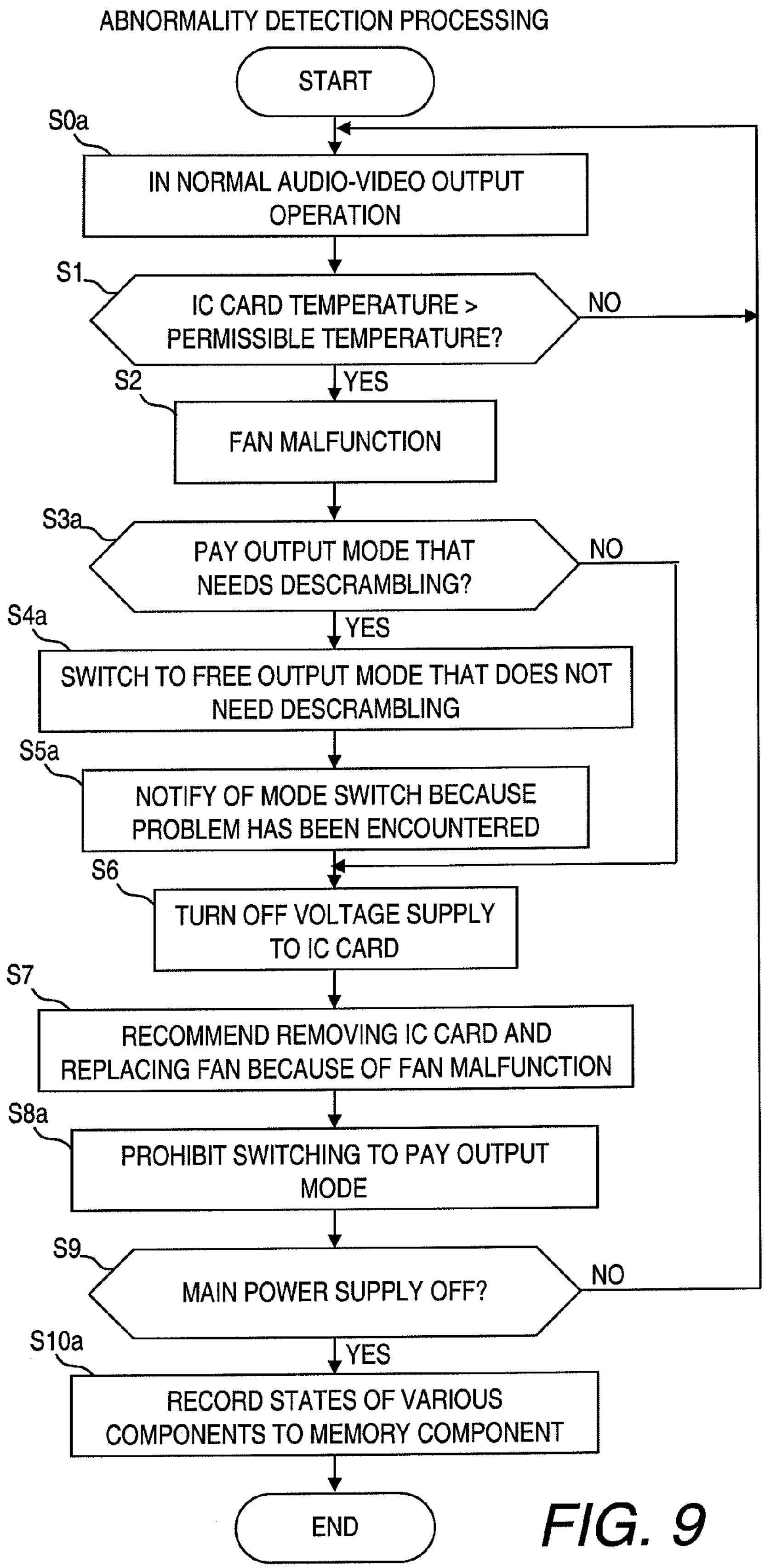
FIG. 9 is a flowchart illustrating an operation of the television set illustrated in FIG. 7 or an operation of the television receiver illustrated in FIG. 8.

FIG. 9 is a flowchart of an operation in abnormality detection processing performed by the television set 101 or the television receiver 102. Processing that is the same as in FIG. 2 is numbered the same. The various processing is executed by the controller **1*a*. During normal audio-video output operation (step S0*a*), the controller 1*a* determines that the temperature of the IC card 10 exceeds the permissible temperature (step S1). In the normal audio-video output operation, the cable television broadcast signal, the terrestrial broadcast signal, the satellite broadcast signal, or the external input signal is received, and an audio-video signal based on the received signal is outputted from the A/V processor 13 or 13*a*. The controller 1*a* determines that the fan 20 has malfunctioned (step S2) when the temperature of the IC card 10 exceeds the permissible temperature (Yes in step S1). If the controller 1*a* determines the television set 101 or television receiver 102 is in a pay output mode (e.g., first output mode) (Yes in step S3*a*), then the controller 1*a* switches the television set 101 or the television receiver 102 to a free output mode (e.g., second output mode) (step S4*a*). The pay output mode is a mode in which an audio-video signal is outputted based on a received signal that can be descrambled by the descrambler 11*a* of the IC card 10. The free output mode is a mode in which an audio-video signal is outputted based on a received signal that does not need to be descrambled by the descrambler 11*a*. The phrase "received signal that can be descrambled by the descrambler 11*a*" above means broadcast signals of pay broadcast channels that have actually been scrambled and have been set to be inputted to the IC card 10. Whether or not a received signal is a broadcast signal of the pay broadcast channel can be determined by confirming whether the tuned-in broadcast channel is a free channel or a pay channel. Information about whether a broadcast channel is free or pay is stored ahead of time in the memory component 16. The "received signal that does not need to be descrambled by the descrambler 11***a*" means an external input signal and a broadcast signal of a free broadcast channel that have not actually been scrambled and have not been set to be inputted to the IC card 10.

Also, the controller la notifies the user that the output mode is being switched because a problem has been encountered (step S5*a*). With the television receiver 102, a message indicating the information to be conveyed, for example, is displayed on-screen on the display component connected to the television receiver 102. Meanwhile, if the television set 101 or the television receiver 102 is in the free output mode (No in step S3*a*), then the controller 1*a* relays the current free output mode. The controller 1*a* then turns off the voltage supply to the IC card 10 (step S6). Then, the controller la issues a notification recommending the removal of the IC card 10 from the card slot 9 and the replacement of the fan 20 because the fan 20 has malfunctioned (step S7*a*). Since the user can be made aware of the malfunction of the fan 20 here by recommending the replacement, etc., of the fan 20, notification of the malfunction of the fan 20 may be omitted. The controller 1*a* then prohibits subsequent switching to the pay output mode (step S8*a*). When the main power supply is turned off (Yes in step S9), the states of the various components are recorded to the memory component 16 (step S10*a*; the state information D3 in FIGS. 7 and 8). Then, processing is concluded. Examples of the content of the state information D3 produced in step S10*a* include that the IC card 10 has reached an abnormal temperature, that the fan 20 has malfunctioned, that the voltage supply to the IC card 10 has been turned off, that the user has been notified to replace the fan 20 and remove the IC card 10, and that switching to the pay output mode has been prohibited.

Figure 10:
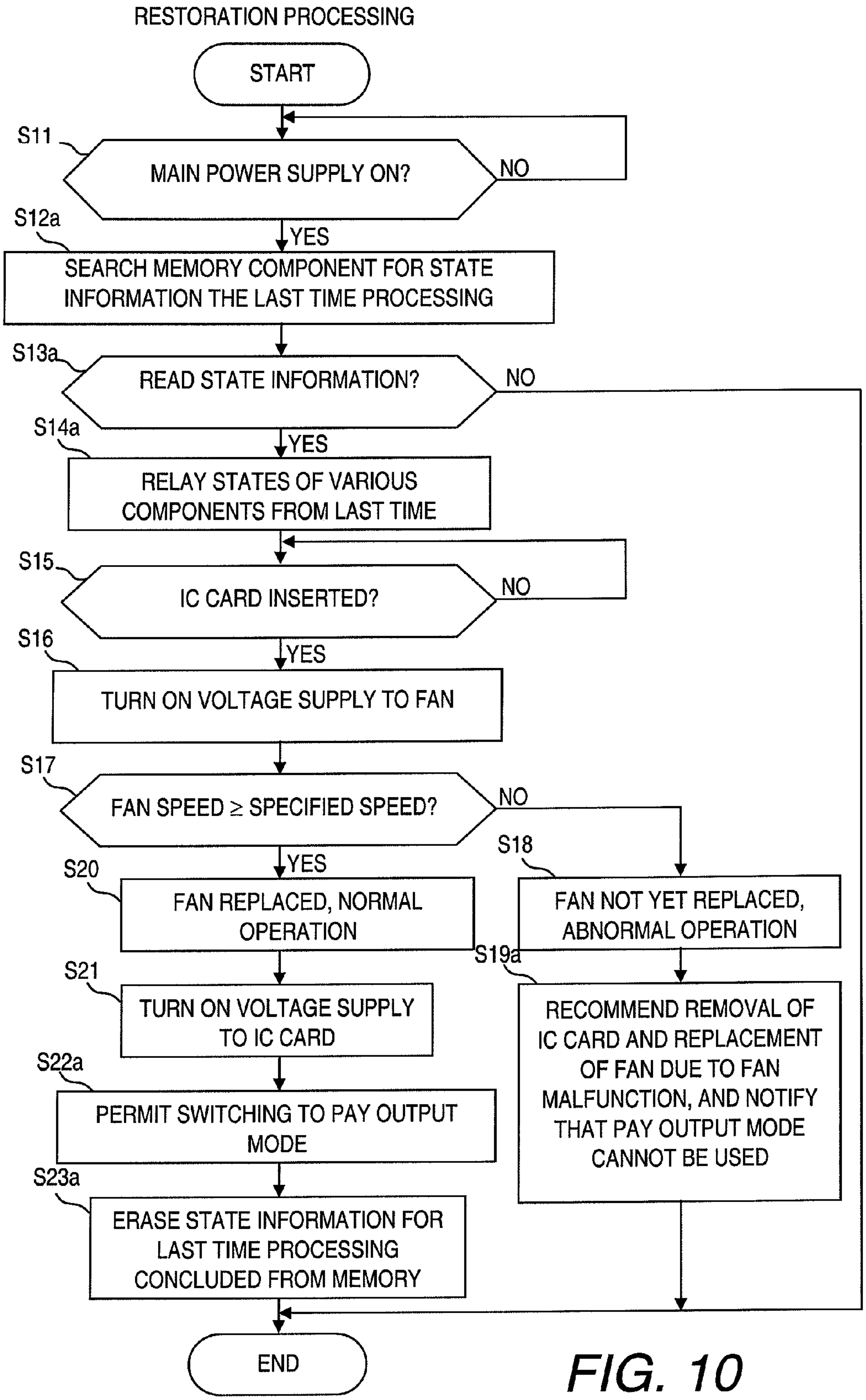
FIG. 10 is a flowchart illustrating an operation of the television set illustrated in FIG. 7 or an operation of the television receiver illustrated in FIG. 8.

FIG. 10 is a flowchart of an operation in restoration processing performed by the television set 101 or the television receiver 102. Processing that is the same as in FIG. 5 is numbered the same. The various processing is executed by the controller 1*a*. First, when the main power supply is turned on (Yes in step S11), the controller 1*a* searches the memory component 16 for the state information D3 of the various components the last time (step S12*a*). If the state information D3 can be found (Yes in step S13*a*), then the states of the various components the last time processing was concluded as indicated by the state information D3 are relayed (step S14*a*). More specifically, the controller 1*a* recognizes from the state information D3 that the controller 1 detected the malfunction of the fan 20 and an abnormal temperature of the IC card 10 during the previous operation, turned off the voltage supply to the IC card 10, issued a notification advising of the malfunction of the fan 20 and recommending the replacement of the fan 20 and the removal of the IC card 10, prohibited switching the television set 101 or the television receiver 102 to the pay output mode. Then, the controller 1*a* leaves the voltage supply to the IC card 10 off, and leaves switching to the pay output mode prohibited. If the controller 1*a* detects the insertion of the IC card 10 (Yes in step S15), then the controller 1*a* turns on the voltage supply to the fan 20 (step S16).

If the speed of the fan 20 does not go up to or above a specific speed for a while (No in step S17), then the controller 1*a* determines that the fan 20 has not been replaced and is still operating abnormally (step S18). Then, the controller 1*a* recommends the removal of the IC card 10 and the replacement of the fan 20 because the fan 20 has malfunctioned, and notifies that the pay output mode cannot be used (step S19*a*). Then, the processing is concluded. Meanwhile, if the speed of the fan 20 does go up to or above the specific speed after a while (Yes in step S17), then the controller 1*a* determines that the fan 20 has been replaced and is operating normally (step S20). Then, the controller la turns on the voltage supply to the IC card 10 (step S21), and permits switching to the pay output mode (step S22*a*). The controller 1 then erases from the memory component 16 the state information D3 for the last time processing was concluded (step S23*a*). Then, the processing is concluded.

With the television set 101 or the television receiver 102, the temperature of the IC card 10 inserted in the card slot 9 can be accurately sensed based on the temperature measured by the temperature sensor 18 and the correlation information D1. Therefore, if the temperature of the IC card 10 should exceed the permissible temperature, then the television set 101 or the television receiver 102 is controlled so that the operation of the IC card 10 is halted and the generation of heat is suppressed. Specifically, the television set 101 or the television receiver 102 is switched from the pay output mode to the free output mode, the voltage supply to the IC card 10 is switched off, and switching to the pay output mode is prohibited. Thus, even if the fan 20 should malfunction and no longer operate properly, it will still be possible to prevent the IC card 10 from malfunctioning due to heat. Also, even if the fan 20 should malfunction, or the temperature of the IC card 10 should exceed the permissible temperature, it will still be possible to protect the IC card 10 while using the television set 101 and the television receiver 102 in the free output mode.

Also, the user is notified of the malfunction of the fan 20, is advised to remove the IC card 10 and replace the fan 20, or is notified that the television set 101 or the television receiver 102 cannot be used in the pay output mode. Thus, the user is immediately made aware of the malfunction of the fan 20 and that the television set 101 or the television receiver 102 cannot be used in the pay output mode. Therefore, the user can remove the IC card 10 and replace the fan 20 properly. Accordingly, the malfunction of the IC card 10 due to heat is prevented even better. Also, since the user can be notified that the output mode will be forcibly switched because a problem has been encountered, the user is less startled by a sudden change in the viewing mode. Also, the states of the various components when the temperature of the IC card 10 has gone over the permissible temperature are relayed to the next time the television set 101 or the television receiver 102 is started up. Therefore, no matter how many times the television set 101 or the television receiver 102 is started up while the fan 20 is malfunctioning, the voltage supply to the IC card 10 will not be turned on and switching to the pay output mode will be prohibited. Thus, the IC card will not begin operation, heat generation will be suppressed, and malfunction of the IC card 10 due to heat can be prevented even better. Furthermore, if it is detected that the fan 20 has been replaced when the main power supply is turned on, then the IC card 10 is immediately actuated, and the state information D3 from the last time processing was concluded is erased. Thus, the television set 101 and the television receiver 102 can be restored to being usable in the pay output mode.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A broadcast receiving device comprising:

a television broadcast signal receiving tuner;

an IC card with a television broadcast signal descrambler;

a card slot configured to accept the IC card;

a fan configured to rotate to cool the IC card;

a temperature sensor configured to measure a first temperature inside the broadcast receiving device;

a memory component configured to store correlation information indicating a correlation between the first temperature measured by the temperature sensor and a second temperature of the IC card; and a control unit configured to acquire the second temperature of the IC card based on the first temperature measured by the temperature sensor and the correlation information stored in the memory component, determine if the second temperature of the IC card exceeds a predetermined temperature, and switch from a first television broadcast signal output mode, in which a scrambled television broadcast signal passes through the descrambler to output a descrambled audio-video signal is outputted via the IC card, to a second television broadcast signal output mode, in which a subsequent television broadcast signal is outputted by bypassing the IC card, when the control unit determines that the second temperature of the IC card exceeds the predetermined temperature.

2. The broadcast receiving device according to claim 1, wherein the control unit is further configured to output a notification indicating removal of the IC card and replacement of the fan when the control unit determines that the second temperature of the IC card exceeds the predetermined temperature.

3. The broadcast receiving device according to claim 2, wherein the control unit outputs the notification after the control unit switches from the first television broadcast signal output mode to the second television broadcast signal output mode and turns off the power supply to the IC card.

4. The broadcast receiving device according to claim 3, wherein the control unit is further configured to store state information in the memory component when main power supply of the broadcast receiving device is turned off, the state information indicating states of the broadcast receiving device at a point when the main power supply of the broadcast receiving device is turned off, and read the state information from the memory component when the main power supply of the broadcast receiving device is turned on to apply the states read from the state information to the broadcast receiving device.

5. The broadcast receiving device according to claim 4, further comprising an insertion detection unit configured to detect an insertion of the IC card into the card slot, and a speed sensing unit configured to sense a rotational speed of the fan, the control unit being configured to turn on power supply to the fan if the insertion detection unit detects the insertion of the IC card when the main power supply of the broadcast receiving device is turned on, and being configured to turn on the power supply to the IC card and permit the second television broadcast signal output mode to be switched to the first television broadcast signal output mode when the rotational speed sensed by the speed sensing unit exceeds a predetermined rotational speed.

6. The broadcast receiving device according to claim 5, wherein the control unit is further configured to delete the state information from the memory component when the rotational speed sensed by the speed sensing unit exceeds the predetermined rotational speed.

7. The broadcast receiving device according to claim 6, further comprising an image display unit configured to output an image based on a current audio-video signal, and an audio output unit configured to output audio based on the current audio-video signal.

8. The broadcast receiving device according to claim 1, wherein the control unit is further configured to turn off power supply to the IC card and prohibit the second television broadcast signal output mode from being switched to the first television broadcast signal output mode when the control unit determines that the second temperature of the IC card exceeds the predetermined temperature.

9. The broadcast receiving device according to claim 8, wherein the control unit is further configured to output a notification indicating removal of the IC card and replacement of the fan when the control unit determines that the second temperature of the IC card exceeds the predetermined temperature.

10. The broadcast receiving device according to claim 9, wherein the control unit outputs the notification after the control unit switches from the first television broadcast signal output mode to the second television broadcast signal output mode and turns off the power supply to the IC card.

11. The broadcast receiving device according to claim 8, wherein the control unit is further configured to store state information in the memory component when main power supply of the broadcast receiving device is turned off, the state information indicating states of the broadcast receiving device at a point when the main power supply of the broadcast receiving device is turned off, and read the state information from the memory component when the main power supply of the broadcast receiving device is turned on to apply the states read from the state information to the broadcast receiving device.

12. The broadcast receiving device according to claim 8, further comprising an insertion detection unit configured to detect an insertion of the IC card into the card slot, and a speed sensing unit configured to sense a rotational speed of the fan, the control unit being configured to turn on power supply to the fan if the insertion detection unit detects the insertion of the IC card when main power supply of the broadcast receiving device is turned on, and being configured to turn on the power supply to the IC card and permit the second television broadcast signal output mode to be switched to the first television broadcast signal output mode when the rotational speed sensed by the speed sensing unit exceeds a predetermined rotational speed.

13. A broadcast receiving device comprising:

a card slot configured to accept an IC card;

a fan configured to rotate to cool the IC card;

a temperature sensor configured to measure a first temperature inside the broadcast receiving device;

a memory component configured to store correlation information indicating a correlation between the first temperature measured by the temperature sensor and a second temperature of the IC card;

an image display unit configured to output an image;

an audio output unit configured to output audio; and a control unit configured to acquire the second temperature of the IC card based on the first temperature measured by the temperature sensor and the correlation information stored in the memory component, determine if the second temperature of the IC card exceeds a predetermined temperature, and switch from a first output mode, in which an audio-video signal is outputted via the IC card in the first output mode that includes an audio-video signal acquired from a cable television broadcast signal, to a second output mode, in which a subsequent audio-video signal is outputted by bypassing the IC Card in the second output mode that includes an audio-video signal acquired from a terrestrial broadcast signal or an input signal from an external video device, when the control unit determines that the second temperature of the IC card exceeds the predetermined temperature.

14. The broadcast receiving device according to claim 13, wherein the IC card is configured to descramble the cable television broadcast signal to output the audio-video signal via the IC card in the first output mode.

15. The broadcast receiving device according to claim 14, wherein the control unit is further configured to output a notification indicating malfunction of the fan when the control unit determines that the second temperature of the IC card exceeds the predetermined temperature.

16. A broadcast receiving method for a broadcast receiving device comprising:

acquiring a television broadcast signal measuring a first temperature inside the broadcast receiving device;

providing correlation information indicating a correlation between the first temperature and a second temperature of an IC card with a television broadcast signal descrambler of the broadcast receiving device;

acquiring the second temperature of the IC card based on the first temperature and the correlation information;

determining if the second temperature of the IC card exceeds a predetermined temperature; and switching from a first television broadcast signal output mode, in which a scrambled television broadcast signal passes through the descrambler to output a descrambled audio-video signal is outputted via the IC card, to a second television broadcast signal output mode, in which a subsequent television broadcast audio-video signal is outputted by bypassing the IC card, upon determining that the second temperature of the IC card exceeds the predetermined temperature.

* * * * *